Dec. 16, 1930.                D. K. BLAKE                 1,785,720
                      SYSTEM OF ELECTRIC DISTRIBUTION
                        Filed March 19, 1929     2 Sheets-Sheet 1

Inventor:
David K. Blake,
by Charles E. Tullar
His Attorney.

Dec. 16, 1930.    D. K. BLAKE    1,785,720
SYSTEM OF ELECTRIC DISTRIBUTION
Filed March 19, 1929    2 Sheets-Sheet 2

Inventor:
David K. Blake,
by Charles E. Tullar
His Attorney.

Patented Dec. 16, 1930

1,785,720

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

SYSTEM OF ELECTRIC DISTRIBUTION

Application filed March 19, 1929. Serial No. 348,337.

My invention relates to systems of electric distribution and particularly to alternating current networks which are supplied with current at a plurality of points by means of feeder circuits fed from the same or different sources of current. In such network systems it is desirable to be able to disconnect a feeder from the network whenever a fault occurs on the feeder and to reconnect the feeder to the network automatically when the feeder is reenergized.

For accomplishing this result various arrangements have been proposed for disconnecting a faulty feeder in response to the flow of power from the network to the feeder and for reconnecting the feeder to the network when the feeder voltage is restored to normal. In such arrangements it is desirable in some cases to arrange the control means which responds to the reverse flow of power from the network to the feeder so that the control means does not respond to a relatively small reversal of power. In such cases where a very high reverse power setting is required and the control means is a power directional relay including cooperating voltage and current windings respectively energized from the feeder, the amount of current required to produce sufficient torque to operate the relay under very low voltage conditions is very large so that the relay may not function properly to effect the disconnection of a faulty feeder in the desired manner. One object of my invention is to provide an improved arrangement whereby the desired disconnection of a faulty feeder is effected under such abnormal voltage conditions of the feeder.

My invention will be better understood from the following description when taken in connection with the accompanying drawings and its scope will be pointed out in the appended claims.

Figure 2:
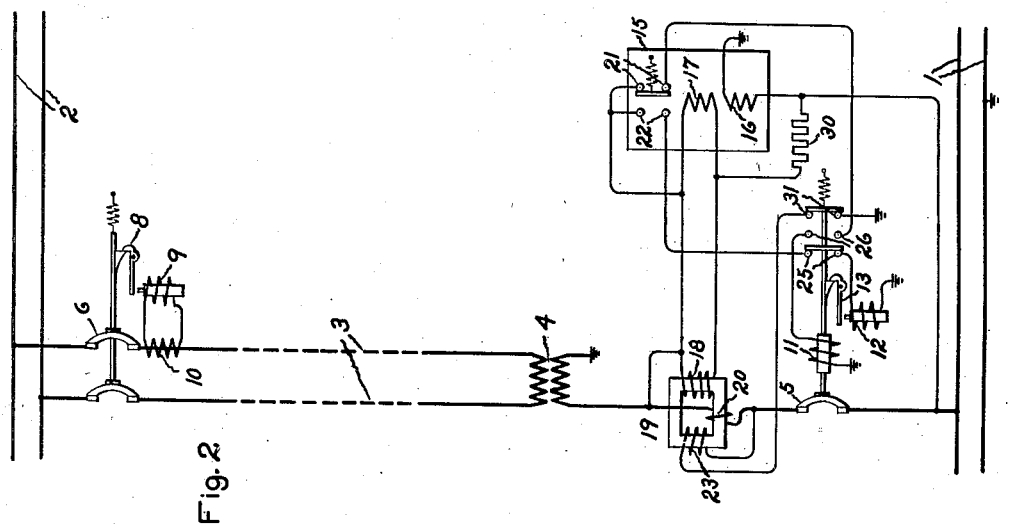
Figure 1:
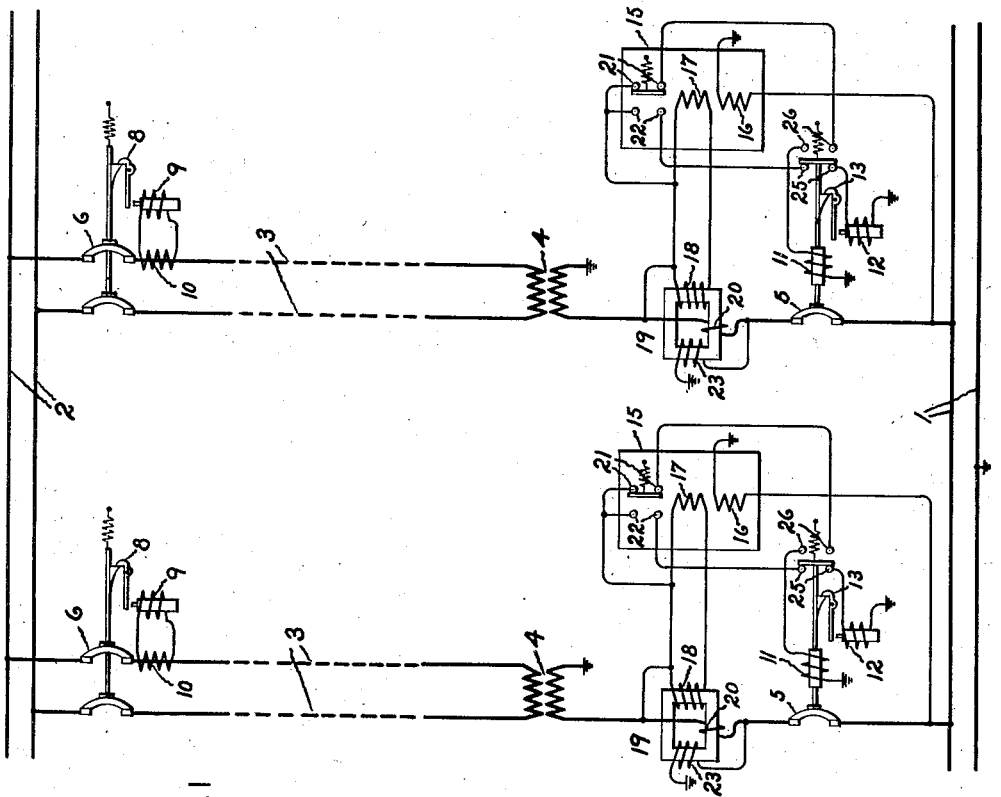
Figure 4:
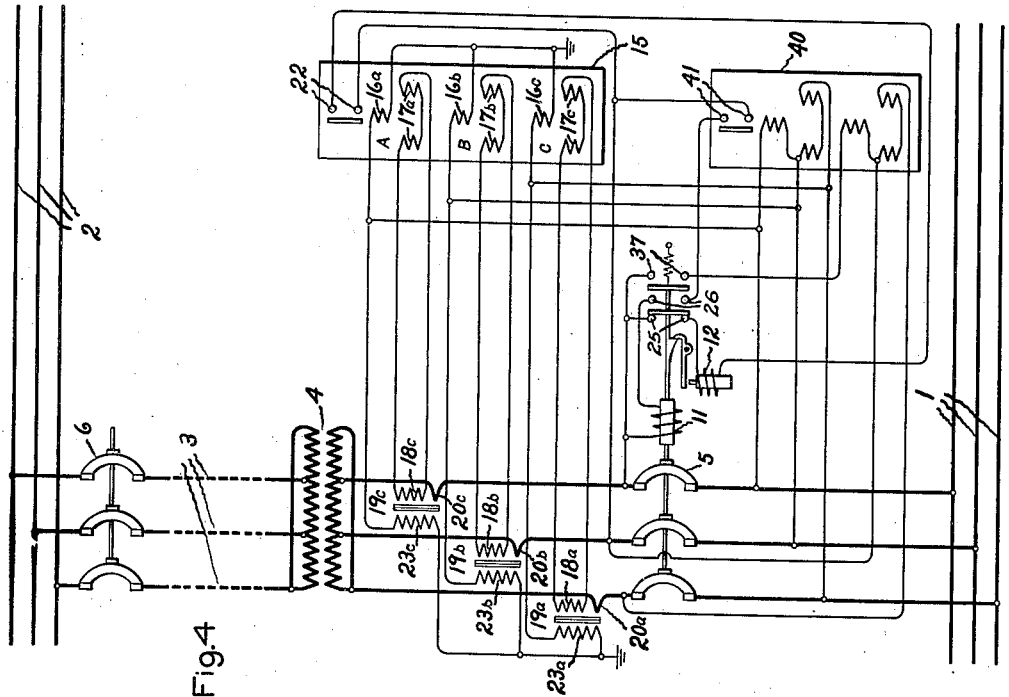
Figure 3:
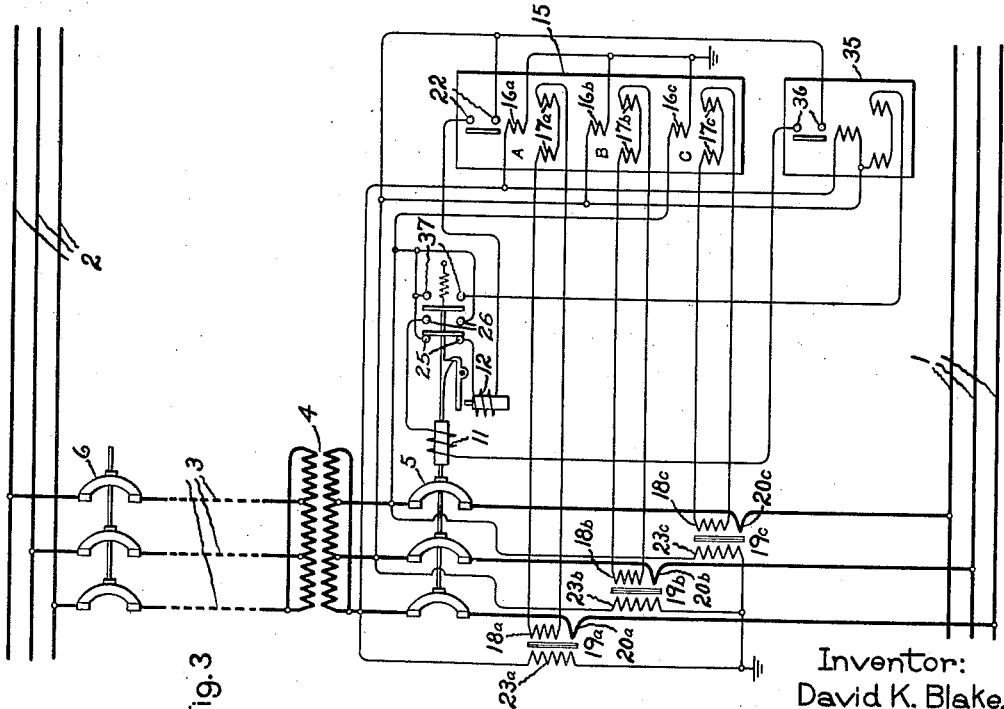

Referring to the drawing, Fig. 1 is a diagram of a single-phase system of electric distribution embodying my invention; Fig. 2 is a modification of the control arrangement shown in Fig. 1; Fig. 3 is a diagram of a modification of my invention applied to a polyphase system of electric distribution; and Fig. 4 is a modification of the control arrangement shown in Fig. 3.

Referring to Fig. 1, 1 is a single-phase network which is arranged to be supplied with electric energy from a suitable supply circuit 2 by means of a plurality of feeder circuits 3, two of which are shown in the drawing.

Each feeder circuit 3 includes a step-down transformer 4, the low voltage secondary winding of which is arranged to be connected to the network 1 by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit by means of a current transformer 10. Any suitable means, either manually or automatically controlled, may be provided for closing the circuit breaker.

The circuit breakers 5 may also be of any suitable type, examples of which are well known in the art. As shown in the drawing, each circuit breaker 5 is of the well known latched-in type and includes a closing coil 11 which, when energized, closes the circuit breaker and a trip coil 12 which when energized releases a latch 13 which holds the circuit breaker in its closed position.

In order to effect the opening of a secondary circuit breaker 5 when a fault occurs in the associated transformer 4 or feeder circuit 3, each circuit breaker 5 has associated therewith a power directional relay 15 which is arranged to effect the energization of the trip coil 12 of the circuit breaker when a predetermined amount of reverse power flows from the network to the associated feeder circuit. The power directional relays 15 may be of any suitable type examples of which are well known in the art. As shown, each power directional relay 15 includes a potential winding 16 which is permanently connected across the network 1 and a current coil 17 which is permanently connected across the secondary winding 18 of a current transformer 19, the primary winding 20 of which is connected in series between the secondary winding of the associated power transformer 4 and the network 1 when the associated circuit breaker 5 is closed. Each power directional relay 15 is arranged so that normally it maintains closed its contacts 21 which are in the energizing circuit of the closing coil 11 of the associated circuit breaker 5. When, however, more than a predetermined amount of reverse power flows from the network 1 to a feeder circuit 3 the associated power directional relay 15 is arranged to open its contacts 21 and closes its contacts 22 which are in an energizing circuit for the trip coil 12 of the associated circuit breaker 5.

In order that each power directional relay 15 may operate to effect the opening of its contacts 21 and the closing of its contacts 22 in response to a high value of reverse power under normal voltage conditions in its associated feeder and in response to values of reverse power which vary directly with the feeder voltage as it varies, I provide, in accordance with my invention, a tertiary winding 23 on the core of each current transformer 19, which is connected in any suitable manner so that it is energized in accordance with the voltage of the associated feeder. As shown in Fig. 1 each tertiary winding 23 is connected across the secondary winding of its associated power transformer 4.

The circuits of windings 20 and 23 of each current transformer are arranged in any suitable manner so that under normal feeder voltage conditions, the resultant voltage induced in the secondary winding 18 of the respective current transformer by the windings 20 and 23 when a predetermined amount of reverse current flows in the associated feeder, causes a current to flow through the current winding 17 of the associated power directional relay 15 which produces, in cooperation with the current in the voltage winding 16, sufficient torque to effect the opening of the relay contacts 21 and the closing of the contacts 22, and so that under subnormal feeder voltage conditions, the resultant voltage induced in the secondary winding 18 by a similar amount of reverse current causes a current to flow through the current winding 17 of the associated power directional relay 15 whereby the resultant torque produced by the windings 16 and 17 does not decrease directly with the change in feeder voltage.

This result may be obtained, for example by designing the circuits of the windings 18 and 23 of the current transformer so that the phase of the current flowing through current winding 17 of the associated power directional relay 15 due to the energization of winding 23 alone is such that the resultant torque produced by this current and the current in the winding 16 of the relay 15 is in a direction to maintain the relay contacts 21 closed.

The windings 23, therefore, by varying the voltage induced in the associated secondary windings, act, in effect, as voltage restraining windings for the associated power directional relays so that the amount of reverse power required to operate a relay varies directly with the feeder voltage.

The operation of the arrangement shown in Fig. 1 is as follows: When the circuit breakers 5 and 6 in a feeder are closed and a fault occurs on the feeder, the abnormal current flowing from the supply circuit through the circuit breaker 6 in the faulty feeder to the fault causes the overload trip coil 9 of the circuit breaker 6 to effect the opening thereof.

The reverse current, which is fed from the network 1 through the circuit breaker 5 in the faulty feeder to the fault and which also flows through the primary winding 20 of the current transformer 19 in the faulty feeder, causes the phase of the resultant voltage induced in secondary winding 18 by the windings 20 and 23 to be changed relative to the phase of the current in the relay winding 16 so that sufficient torque is produced by the relay windings 16 and 17 in the proper direction to effect the opening of the relay contacts 21 and the closing of the relay contacts 22. The amount of reverse current required to effect this operation of the relay depends upon the voltage of the feeder circuit since the restraining effect produced by the voltage induced in the current transformer secondary winding 18 by the voltage winding 23 alone varies directly with the feeder voltage.

When the power directional relay 15 closes its contacts 22 it connects the trip coil 12 and the auxiliary contacts 25 on the circuit breaker 5 in the faulty feeder in series across the secondary of the associated transformer 4 so that the circuit breaker 5 is opened to disconnect the faulty feeder from the network. As soon as the circuit breaker 5 opens the winding 17 of the associated power directional relay 15 is deenergized and the relay opens its contacts 22 and closes its contacts 21 so that the closing coil 11 of the open circuit breaker 5 and its auxiliary contacts 26 are connected in series across the secondary winding of the deenergized potential transformer 4. Therefore, when the voltage of the faulty feeder 3 is restored to normal, the circuit breaker 5 therein is closed to reconnect the feeder to the network 1.

In the modification shown in Fig. 2 the reclosing of the circuit breaker does not depend solely upon the restoration of the feeder circuit voltage to normal but takes into consideration the relative phase and magnitude of the feeder and network voltages. This result is accomplished in the well known manner by also connecting the current coil 17 of the power directional relay 15 and a suitable current-limiting device 30 so that when the circuit breaker 5 is open the relay 15 maintains its contacts 21 open until a predetermined relation exists between the phases and magnitudes of the feeder and network voltages.

In order that the voltage winding 23 may not control the operation of the relay 15 during the reclosing operation thereof as it is not desirable to have a reclosing characteristic similar to the opening characteristic, I include auxiliary contacts 31 on the circuit breaker 5 in circuit of the voltage winding 23 so that this winding is energized only while the switch 5 is closed.

In the modification illustrated in Fig. 3 in which I have shown my invention applied to a three-phase system, the power directional relay 15 is a polyphase relay of any suitable type having three operating elements A, B, and C, including respectively the voltage windings 16a, 16b, and 16c, responsive to the voltages of different phases of the feeder 3 and the current windings 17a, 17b, and 17c, respectively connected to the secondary windings 18a, 18b, and 18c of the current transformers 19a, 19b, and 19c, the primary windings 20a, 20b, and 20c of which are connected in series with different secondary conductors of the feeder circuit 3. The current transformers 19a, 19b, and 19c, are also provided respectively with voltage windings 23a, 23b, and 23c, which are energized in response to different phase voltages of the feeder 3.

In order to effect the reclosing of the circuit breaker 5 I provide in this modification a separate polyphase voltage relay 35 which is arranged to be connected to the feeder circuit 3 so as to be responsive to the polyphase voltage thereof when the circuit breaker 5 is open. The relay 35 may be of any suitable type, examples of which are well known in the art, which will effect the closing of its contacts 36 only when the voltages of all of the phases of the feeder are above predetermined values. Preferably the relay 35 is designed in any suitable manner, examples of which are well known in the art, so that it closes its contacts 36 only after the feeder phase voltages have remained above the predetermined values for a predetermined time.

As shown, the circuit breaker 5 is provided with auxiliary contacts 37 in the circuit of one of the windings of the relay 35 so that the relay is operative to close its contacts 36 only when the circuit breaker 5 is open.

The operation of the modification shown in Fig. 3 is obvious from the above description of Fig. 1. When a fault occurs on any phase of the feeder 3 the power directional relay 15 closes its contacts 22 and effects the energization of the trip coil 12 to open the circuit breaker 5 and disconnect the faulty feeder from the network 1. When the polyphase voltage of the feeder 3 is subsequently restored to normal the polyphase relay 35 closes its contacts 36 and effects the energization of the closing coil 11 to close the circuit breaker 5.

The voltage windings 23a, 23b, and 23c, operate in the same manner as the voltage windings 23 in Figs. 1 and 2 to change the opening characteristic of the relay 15.

In the modification shown in Fig. 4 the voltage windings 16a, 16b, and 16c, of the power directional relay and the voltage windings 23a, 23b, and 23c, of the current transformers 19a, 19b, and 19c, respectively are connected so as to be energized in response to the voltage on the network side of the circuit breaker 5 instead of on the transformer side of the circuit breaker 6 as shown in Fig. 3.

I have also shown a polyphase balance relay 40 for controlling the reclosing of the circuit breaker 5 which is responsive to the relative magnitudes of the feeder and network polyphase voltages instead of a polyphase voltage relay which depends solely upon the feeder voltage as shown in Fig. 3.

The operation of the arrangement shown in Fig. 4 is the same as Fig. 3 except that the circuit breaker 5 is not reclosed in response to the reenergization of the feeder 3 until a predetermined relation exists between the magnitudes of the polyphase voltages of the feeder and network. Preferably the relay 40 is designed so that it closes its contacts 41 in the circuit of the closing coil 11 whenever the polyphase voltage of the feeder 3 is substantially equal to or exceeds the polyphase voltage of the network.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, two electric circuits, a circuit breaker interconnecting said circuits, a current transformer having three inductively connected windings, two of which are respectively connected so as to be responsive to the voltage of the interconnected circuits and the current flowing between them, and a power directional relay for controlling the opening of said circuit breaker having a winding connected to the third winding of said current transformer.

2. In combination, an electric circuit, a circuit breaker in said circuit, a current transformer having three inductively connected windings, two of which are respectively energized in response to the voltage and current of said circuit, and electroresponsive means for controlling the operation of said circuit breaker having a winding connected to the third winding of said transformer.

3. In combination, an alternating current supply circuit, an alternating current load circuit, a power transformer having its primary winding connected to said supply circuit and its secondary winding connected to said load circuit, a circuit breaker between said transformer secondary winding and the load circuit, a current transformer having a primary winding connected in series between the transformer secondary and the load circuit when said circuit breaker is closed and a secondary winding, a power directional relay for effecting the opening of said circuit breaker when power flows from said load circuit to said supply circuit including a current winding connected to the secondary winding of said current transformer, and a third winding on the core of said current transformer connected so as to be responsive to the voltage of the interconnected transformer secondary and load circuit when said circuit breaker is closed.

4. In combination, an alternating current feeder circuit, an alternating current network, a circuit breaker between said feeder circuit and network, a current transformer having a primary winding connected in series between said feeder circuit and network when said circuit breaker is closed and a secondary winding, a third winding for said current transformer connected so as to be responsive to the voltage of said feeder circuit when said circuit breaker is closed, a power directional relay for controlling the opening of said circuit breaker having a voltage winding connected across said network and a current winding connected across said secondary winding of said transformer, and means controlled by the voltage of said feeder circuit for effecting the closing of said circuit breaker.

5. In combination, a polyphase feeder circuit, a polyphase network, a circuit breaker between said circuit and network, a current transformer in each phase of said circuit including a primary winding responsive to the current flowing in the respective phase and a secondary winding and a tertiary winding responsive to a voltage of said circuit, a polyphase power directional relay for controlling the opening of said circuit breaker, including a plurality of current windings respectively connected across said secondary windings of said transformers, and means controlled by the voltage of said feeder circuit for closing said circuit breaker.

6. In combination, two polyphase circuits, a circuit breaker interconnecting said circuits, a plurality of current transformers having windings respectively connected in series relation with different phases of one of said circuits and having windings respectively energized in accordance with different phase voltages of one of said circuits, and a polyphase power directional relay for effecting the opening of said circuit breaker including a plurality of current windings respectively energized by said current transformers.

7. In combination, a polyphase feeder circuit, a polyphase network, a circuit breaker between said circuit and network, a current transformer in each phase of said circuit including a primary winding responsive to the current flowing in the respective phase and a secondary winding and a tertiary winding responsive to the respective phase voltage, a polyphase power directional relay for controlling the opening of said circuit breaker including a plurality of current windings respectively connected to the secondary windings of said transformers and a plurality of cooperating voltage windings, and means controlled by the polyphase voltage of said feeder for closing said circuit breaker.

8. In combination, a polyphase feeder circuit, a polyphase network, a circuit breaker between said circuit and network, a current transformer in each phase of said circuit including a primary winding responsive to the current flowing in the respective phase and a secondary winding and a tertiary winding responsive to the respective phase voltage, a polyphase power directional relay for controlling the opening of said circuit breaker, including a plurality of current windings respectively connected to the secondary windings of said transformers and a plurality of cooperating voltage windings, and means responsive to the relative voltages of said feeder circuit and network for effecting the closing of the circuit breaker.

9. In combination, an alternating current feeder circuit, an alternating current network, a circuit breaker between said feeder circuit and network, a current transformer having a primary winding connected in series between said feeder circuit and network when said circuit breaker is closed and a secondary winding, a power directional relay for controlling the operation of said circuit breaker having a current winding connected across said secondary winding of said transformer, and means independent of said relay for inducing in the circuit of the current winding of said relay a voltage proportional to the voltage of said circuit.

10. In combination, an alternating current supply circuit, an alternating current load circuit, a power transformer having its primary winding connected to said supply circuit and its secondary winding connected to said load circuit, a circuit breaker between said transformer secondary winding and the load circuit, a current transformer having a primary winding connected in series between the transformer secondary and the load circuit when said circuit breaker is closed and a secondary winding, a power directional relay for effecting the opening of said circuit breaker when power flows from said load circuit to said supply circuit including a current winding connected to the secondary winding of said current transformer, and a third winding on the core of said current transformer connected across the secondary winding of said power transformer.

11. In combination, an electric circuit, a circuit breaker in said circuit and a power directional relay for controlling the opening of said circuit breaker including a winding simultaneously connected in series and in shunt relation with said circuit.

12. In combination, two alternating current circuits, a circuit breaker between said circuits, and a power directional relay for controlling the opening of said circuit breaker including a winding so connected to said circuits that it is energized in response to both the current flowing between said circuits and the voltage of one of said circuits.

13. In combination, two alternating current circuits, a circuit breaker between said circuits, a power directional relay for controlling the opening of said circuit breaker including a winding so connected to said circuits that it is energized in response to both the current flowing between said circuits and the voltage of one of said circuits when said circuit breaker is closed, and means controlled by said circuit breaker for controlling the energization of said winding so that it is energized only in response to the current flowing between said circuits when said circuit breaker is open.

In witness whereof, I have hereunto set my hand this 18th day of March, 1929.

DAVID K. BLAKE.